(12) United States Patent
Toba et al.

(10) Patent No.: US 6,874,670 B2
(45) Date of Patent: Apr. 5, 2005

(54) APPARATUS FOR USE IN WELDING OF A SEAT BACK FRAME

(75) Inventors: Eiji Toba, Tochigi (JP); Hidesato Yoshida, Tochigi (JP); Koji Sakai, Niigata (JP)

(73) Assignees: TS Tech Co., Ltd. (JP); Nojimaseisakusyo Co., Ltd. (JP)

( * ) Notice: Subject to any disclaimer, the term of this patent is extended or adjusted under 35 U.S.C. 154(b) by 45 days.

(21) Appl. No.: 10/662,121

(22) Filed: Sep. 12, 2003

(65) Prior Publication Data

US 2004/0129757 A1 Jul. 8, 2004

(30) Foreign Application Priority Data

Sep. 12, 2002 (JP) ........................................ 2002-267055

(51) Int. Cl.[7] .................................................. B23K 37/04
(52) U.S. Cl. ..................................... 228/44.3; 228/49.1
(58) Field of Search .............................. 228/44.3, 47.1, 228/49.1, 49.4, 212, 213; 219/86.24

(56) References Cited

U.S. PATENT DOCUMENTS

| | | | | |
|---|---|---|---|---|
| 4,629,109 A | * | 12/1986 | Matsushita | ................. 228/49.1 |
| 4,749,116 A | * | 6/1988 | Yajima | ........................ 228/6.1 |
| 4,893,398 A | * | 1/1990 | Zimmer | ........................ 483/14 |
| 5,833,432 A | * | 11/1998 | Fujii et al. | .................... 414/732 |
| 6,132,003 A | * | 10/2000 | Sakurai et al. | ......... 297/452.18 |
| 6,312,053 B1 | | 11/2001 | Magyar | |
| 6,783,177 B1 | * | 8/2004 | Nakano | ................. 297/216.12 |
| 2004/0084945 A1 | * | 5/2004 | Toba et al. | ................. 297/367 |
| 2004/0129757 A1 | * | 7/2004 | Toba et al. | ................. 228/44.3 |
| 2004/0227389 A1 | * | 11/2004 | Yosida | ................... 297/452.18 |

FOREIGN PATENT DOCUMENTS

| | | | |
|---|---|---|---|
| JP | 2578602 | | 9/1986 |
| JP | 403023098 A | * | 1/1991 |
| JP | 8253063 | | 10/1996 |
| JP | 02004098156 A | * | 4/2004 |

* cited by examiner

*Primary Examiner*—Kiley S. Stoner
(74) *Attorney, Agent, or Firm*—Dann, Dorfman, Herrell and Skillman, P.C.

(57) ABSTRACT

There are provided a receiving base serving as a base on which a seat back frame is carried in a laid state, and a setting mechanism for holding an axis of a supporting shaft interconnecting actuating shafts projecting from locking mechanisms, the setting mechanism which has held the axis of the supporting shaft being mounted through stand bases to the receiving base so as to be swingable and being adapted to be swung by a driving cylinder which generates a force to the extent that the actuating shafts are not rotated, so that the axis of the supporting shaft can rotated relative to the actuating shafts by an allowed rotational amount according to actuation of the driving cylinder.

4 Claims, 18 Drawing Sheets

APPARATUS FOR USE IN WELDING OF A SEAT BACK FRAME

BACKGROUND OF THE INVENTION

1. Field of the Invention

This invention relates to an apparatus for use in welding of a seat back frame for a reclining seat having locking mechanisms provided at lower portions of both side frame sections of the seat back frame for locking a seat back relative to a seat cushion and, more particularly, to an apparatus which is employed when a supporting shaft of a substantially cylindrical shape which is to interconnect the locking mechanisms is welded to one of the locking mechanisms.

2. Description of Related Art

Generally, as a reclining seat for an automotive vehicle, there is employed a seat that is provided at pivotal portions between a seat back and a seat cushion with locking mechanisms for locking the seat back relative to the seat cushion.

Referring to FIG. 23, there is illustrated the conventional seat which is provided with the locking mechanisms and is an assistant seat (companion seat) for an automotive vehicle having a steering wheel at the right side. The locking mechanisms 1, 1' that are constructed in the same manner are provided at pivotal portions between side frame sections 2a, 2b of a seat back frame 2 and brackets 3a, 3b of a seat cushion frame (not shown). A supporting shaft 4 of a substantially cylindrical shape interconnects the locking mechanisms 1, 1'. An operating lever 5 is provided at the locking mechanism 1 which is arranged at the left side of a passenger sitting on the seat (adjacent a door of the automotive vehicle (at the right side in FIG. 23)).

Referring to FIG. 24, spiral springs 6 (only one spiral spring 6 is shown in FIG. 24) are stretched between the side frame sections 2a, 2b and the brackets 3a, 3b. A coil spring 7 is stretched between the operating lever 5 and the bracket 3a. In the seat constructed as mentioned above, when the locking mechanisms are synchronously unlocked by operating the operating lever 5, a seat back of the seat can be reclined relative to a seat cushion of the seat, or can be returned to an original state, and a posture of the seat back relative to the seat cushion can be changed by adjusting an angle of the seat back relative to the seat cushion.

As each of the locking mechanisms, there is employed a locking mechanism which comprises a disk-like housing, a disk-like cover plate including an annular wall having gear teeth formed on an inner surface thereof, the housing and cover plate being combined with each other in a face-to-face relation so as to be rotatable relative to each other, locking gears provided at regions of peripheries thereof with gear teeth which are adapted to be meshed with the gear teeth of the cover plate, and a cam for causing the locking gears to be releasably meshed with the gear teeth of the cover plate, the locking gears and the cam being arranged between the housing and the cover plate (for example, French Patent No. 2,578,602, Japanese patent application laid open under Provisionary Publication No. Hei. 8-253063 and U.S. Pat. No. 6,312,053).

Referring now to FIG. 25, as one example of the locking mechanisms, there is illustrated a concrete construction of the locking mechanism 1 arranged at the left side. The locking mechanism 1 comprises a disk-like housing 10, a disk-like cover plate having gear teeth provided around an inner surface of an annular wall thereof, locking gears 12, 13, 14 having gear teeth 12b, 13b, 14b provided at regions of peripheries thereof, a round bar-like actuating shaft 16, and a cam 15 for causing the locking gears 12–14 to be displaced, the cam being mounted on the actuating shaft 16. The locking mechanism 1 further includes spiral springs 17a, 17b, 17c for urging and supporting the cam 15, a guide pate 18 for inducting the locking gears 12–14 and causing the locking gears 12–14 to be displaced, a ring-like cover 19 for holding the housing 10 and the cover plate 11 while maintaining the housing 10 and the cover plate in a face-to-face relation.

The locking mechanisms 1, 1' are provided at the pivotal portions between the seat back and the seat cushion by causing the housings 10 to be secured to the brackets 3a, 3b of the seat cushion frame, and causing the cover plates 11 to be secured to the side frame sections 2a, 2b of the seat back frame. A supporting shaft 4 is interconnects the actuating shafts 16 of the locking mechanisms 1, 1'.

When the locking mechanisms 1, 1' are mounted to lower portions of the side frame sections 2a, 2b, the round bar-like actuating shafts 16, 16 are penetrated through the side frame sections 2a, 2b, projected inwardly from the side frame sections 2a, 2b so as to be aligned with each other, fitted in both end portions of the supporting shaft 4 and rigidly welded to the both end portions of the supporting shaft 4.

In the conventional seat in which the supporting shaft 4 is rigidly welded at the both end portions thereof to the actuating shafts 16, 16, when the passenger having sat on the seat operates the operating lever or the passenger causes the seat back to be returned to a condition where the passenger can sit on the seat, if any force which tends to cause the supporting shaft to be twisted is applied to the supporting shaft, there is a possibility that the cams of the locking mechanisms will not be synchronously actuated and will be actuated differentially from each other. Therefore, the locking gears of one of the locking mechanisms are normally meshed with the gear teeth of a corresponding cover plate, whereas the locking gear of the other of the locking mechanisms may not be normally meshed with the gear teeth of a corresponding cover plate. This results in a situation in which an angle of the seat back relative to the seat cushion can not be smoothly adjusted in such a manner that the passenger is allowed to sit on the seat.

In order to prevent the differential actuation of the cams, it is proposed that one end portion of the supporting shaft is coupled to the actuating shaft of one of the locking mechanisms so as to be rotatable relative to the actuating shaft of the one of the locking mechanisms at an angle of a few degrees. In this case, even if any force which tends to cause the supporting shaft to be twisted is applied to the supporting shaft, the cams of the locking mechanisms are not actuated differentially from each other, and the locking gears of the locking mechanisms are kept normally engaged with the gear teeth of the corresponding cover plates, so that the seat back can be smoothly reclined relative to the seat cushion.

Referring now to FIG. 26 illustrating the concrete connecting construction of the supporting shaft and the actuating shaft 16' of the one of the locking mechanisms, the one end portion 4b of the supporting shaft 4 is deformed in a substantially elliptic shape in cross-section, and one end portion of the actuating shaft 16' is deformed in such a manner that the actuating shaft 16' is allowed to be rotatable relative to the supporting shaft 4 at an angle of a few degrees in a condition where the one end portion of the actuating shaft 16' is coupled to the one end portion 4b of the supporting shaft 4. The one end portion 4b of the supporting shaft 4 and the actuating shaft 16' are coupled to each other in such a manner that they become engaged with each other at a rotation starting point of the operating lever (the operating lever is adapted to be rotated in such a direction as to be indicated by an arrow in FIG. 26). The other end portion of the supporting shaft 4 is rigidly connected to the actuating shaft 16 of the other of the locking mechanisms by welding.

In this construction, when the operating lever is to be rotated by the passenger, the one end portion of the supporting shaft 4 and the actuating shaft 16' are in the engaged condition, so that the both locking mechanisms can be synchronously actuated at the instant.

Furthermore, the one end portion of the supporting shaft 4 is coupled to the actuating shaft 16' of the locking mechanism so as to be rotatable relative to the actuating shaft 16' at the angle of a few degrees, so that when any force which tends to cause the supporting shaft 4 to be twisted is applied to the supporting shaft 4, the supporting shaft 4 is rotated relative to the actuating shaft 16'. Therefore, any force which tends to cause the cams of the both locking mechanisms to be actuated differentially from each other is not applied to the both locking mechanisms, and the locking gears of the both locking mechanisms can be kept normally meshed with the gear teeth of the corresponding cover plates.

As discussed above, the supporting shaft is merely fitted at the both end portions thereof on the actuating shafts which project inwardly from the side frame sections so as to be aligned with each other when the locking mechanisms are mounted to the lower portions of the side frame sections. In this condition, the deformed one end portion 4b of the supporting shaft 4 may not always be normally engaged with the deformed one end portion of the actuating shaft 16'. Therefore, when the other end portion of the supporting shaft is to be welded to the actuating shaft 16, it is necessary to adjust an angular deviation of the one end portion 4b of the supporting shaft 4 relative to the actuating shaft 16' in such a manner that the one end portion 4b of the supporting shaft 4 is previously engaged with the actuating shaft 16' at the rotation starting point of the operating lever.

The engagement of the one end portion 4b of the supporting shaft 4 with the actuating shaft 16' may be performed by causing the supporting shaft 4 to be rotated relative to the actuating shaft 16' by hand. However, when the other end portion of the supporting shaft is to be welded to the actuating shaft 16, a worker must weld the other end portion of the supporting shaft to the actuating shaft 16 while gripping the supporting shaft so as not to cause the supporting shaft to be shifted relative to the actuating shaft 16'. This is very troublesome.

SUMMARY OF THE INVENTION

The present invention has been made with a view to overcoming the foregoing problem.

It is an object of this invention to provide an apparatus for use in welding of a seat back frame, which can positively compensate a coupled condition between a deformed end portion of a supporting shaft and a deformed end portion of one of actuating shafts of locking mechanisms in such a manner that engagement between the deformed end portion of the supporting shaft and the deformed end portion of the actuating shaft is accomplished at a rotation-starting point of an operating lever, even if the deformed end portion of the supporting shaft is coupled to the deformed end portion of the actuating shaft in any coupled state, and facilitates welding of the other end of the supporting shaft to the other of the actuating shafts of the locking mechanisms.

It is another object of the present invention to provide an apparatus for use in welding of a seat back frame, which can stably position a seat back frame and a supporting shaft with a simple construction.

It is still another object of this invention to provide an apparatus for use in welding of a seat back frame, which can positively compensate a coupled state between one end portion of a supporting shaft and an end portion of one of actuating shafts of locking mechanisms in such a manner that engagement between the one end portion of the supporting shaft and the end portion of the one of the actuating shafts of the locking mechanisms can be positively carried out at a rotation-starting point of an operating lever, with a simple construction.

In accordance with the present invention, there is provided an apparatus for use in welding of a seat back frame. The seat back frame includes side frame sections, on lower portions of which first and second locking means for a reclining mechanism are provided. The first and second locking means include first and second actuating shafts which penetrate the side frame sections and project inward of the seat back frame so as to be aligned with each other. The first and second actuating shafts are coupled to each other through a supporting shaft. One of the first and second actuating shafts has an deformed end portion. The supporting shaft has first and second end portions. One of the first and second end portions of the supporting shaft has opposed deformed peripheral wall portions. The one of the first and second end portions of the supporting shaft is coupled to the deformed end portion of the one of the first and second actuating shafts so as to be rotatable relative to the one of the first and second actuating shafts at an angle of a few degrees. The other of the first and second end portions of the supporting shaft is coupled to the other of the first and second actuating shafts and rigidly welded to the other of the first and second actuating shafts. The apparatus comprises a receiving base for allowing the seat back frame to be carried thereon in a laid state and adapted for serving as a base of the apparatus, first setting means mounted on the receiving base for positioning and holding the seat back frame carried on the receiving base, second setting means for clamping and holding the supporting shaft coupled to the first and second actuating shafts of the first and second locking means provided at the seat back frame, stand bases mounted on the receiving base for supporting the second setting means in such a manner that the second setting means can be swung relative to the stand bases, and a first driving cylinder mounted on the receiving base and coupled to the second setting means for causing the second setting means to be swung relative to the stand bases prior to the welding of the other of the first and second actuating shafts to the other of the first and second actuating shafts, the first driving cylinder being adapted to develop a force to the extent that the supporting shaft held by the second setting means is rotated relative to the first and second actuating shafts of the first and second locking means provided at the seat back frame but the first and second actuating shafts are not rotated, when the first driving cylinder causes the second setting means to be swung, so that when the second setting means having clamped and held the supporting shaft is swung in a predetermined direction by the first driving cylinder, the supporting shaft is rotated by an allowed rotational amount relative to the first and second actuating shafts in a direction opposite to such a direction that the supporting shaft is shifted from a predetermined engaged point between the supporting shaft and the deformed end portion of the one of the first and second actuating shaft, whereby the one of the first and second end portions of the supporting shaft can be normally engaged with the deformed end portion of the one of the first and second actuating shafts at the predetermined engaged point, prior to the welding of the other of the first and second actuating shafts to the other of the first and second actuating shafts.

The first setting means comprises a plurality of dampers for clamping and holding the seat back frame on the receiving base from a periphery of the seat back frame. The second setting means comprises a supporting base having a step portion that comprises a vertical surface and a horizontal surface, an axis of the supporting shaft being adapted to be received by the vertical and horizontal surfaces, and a second driving cylinder for pressing the axis of the supporting shaft against the vertical surface of the supporting base, the second driving cylinder being provided integrally with the supporting base. The supporting base has supporting pins projecting from sides thereof. The stand bases have circular-arc shaped guide grooves formed in sides thereof. The supporting pins of the supporting base are received in the guide grooves of the stand bases so as to be slid along the guide grooves, whereby the second setting means having held the axis of the supporting shaft can be swung. The first driving cylinder which generates the force to the extent that the supporting shaft is rotated relative to the first and second actuating shafts but the first and second actuating shafts are not rotated is provided between said supporting base and said receiving base.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENTS

Figure 1:
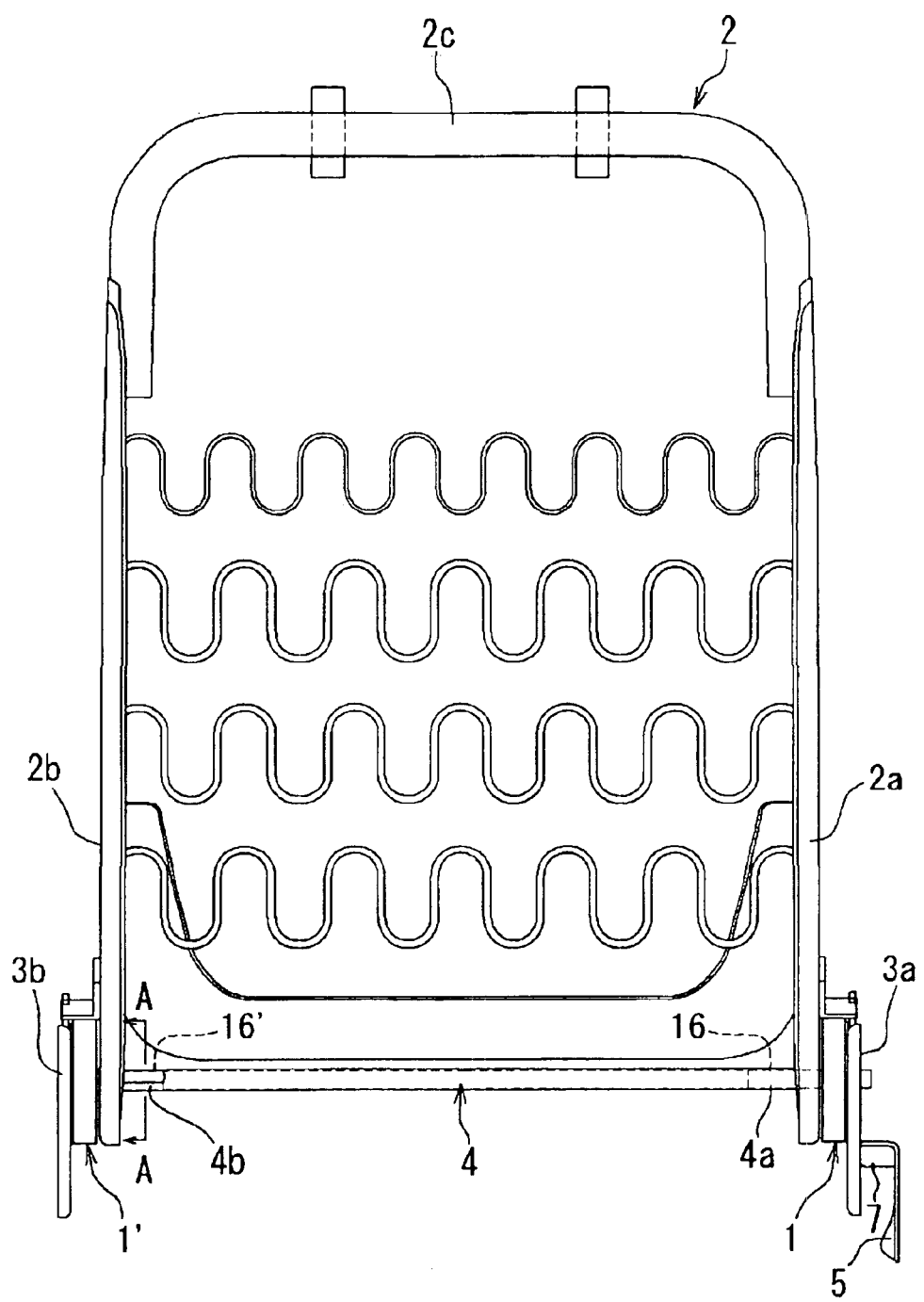
FIG. 1 is a front view of one example of seat back frames which may be constructed using an apparatus for use in welding of a seat back frame according to the present invention.

Referring to FIG. 1, there is illustrated a seat back frame 2 to which an apparatus for use in welding of a seat back frame for a seat according to the present invention is to be applied. The seat back frame 2 comprises three sections including side frame sections 2a, 2b and an upper section 2c. After locking mechanisms 1, 1' for locking a seat back relative to a seat cushion are mounted on lower portions of the side frame sections 2a, 2b with actuating shafts 16, 16' thereof being projected inwardly of the seat back frame 2 so as to be aligned with each other, and a supporting shaft 4 of a substantially cylindrical shape for interconnecting the locking mechanisms 1, 1' is coupled to the actuating shafts 16, 16', the apparatus is used in rigidly welding only one end portion 4a of the supporting shaft 4 to one 16 of the actuating shafts.

Figure 2:
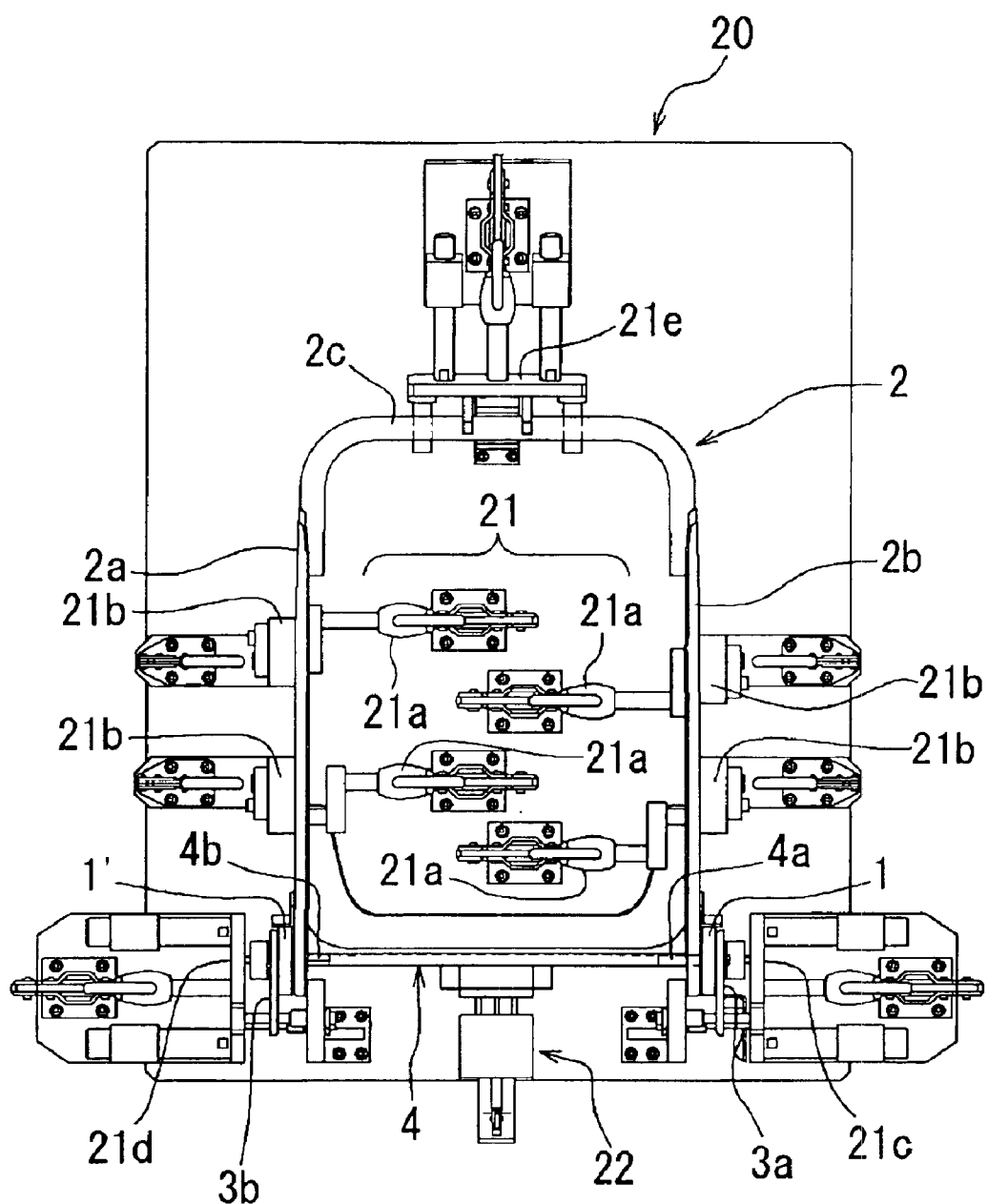
FIG. 2 is a plan view of the apparatus according to the present invention.

Referring to FIG. 2, there is illustrated the apparatus for use in welding a seat back frame according to the present invention. The apparatus includes a receiving base 20 serving as a base of the apparatus, on which the seat back frame 2 is adapted to be carried in a laid state, a first setting means 21 for positioning and holding the seat back frame 2 carried on the receiving base 20, and a second setting means 22 for clamping and holding an axis of the supporting shaft 4 coupled to the actuating shafts (not shown) of the locking mechanisms 1, 1'.

The first setting means 21 includes several pairs of dampers 21a, 21b which hold the side frame section 2a, 2b of the seat back frame 2 from inward and outward of the seat back frame 2 and pinch the side frame sections 2a, 2b therebetween. In addition to the dampers 21a, 21b, the first setting means 21 includes pushers or dampers 21c, 21d for positioning and holding brackets 3a, 3b of a seat cushion frame from the right and left sides, and a pusher or damper 21e for positioning and holding the upper section 2c of the seat back frame 2.

Figure 3:
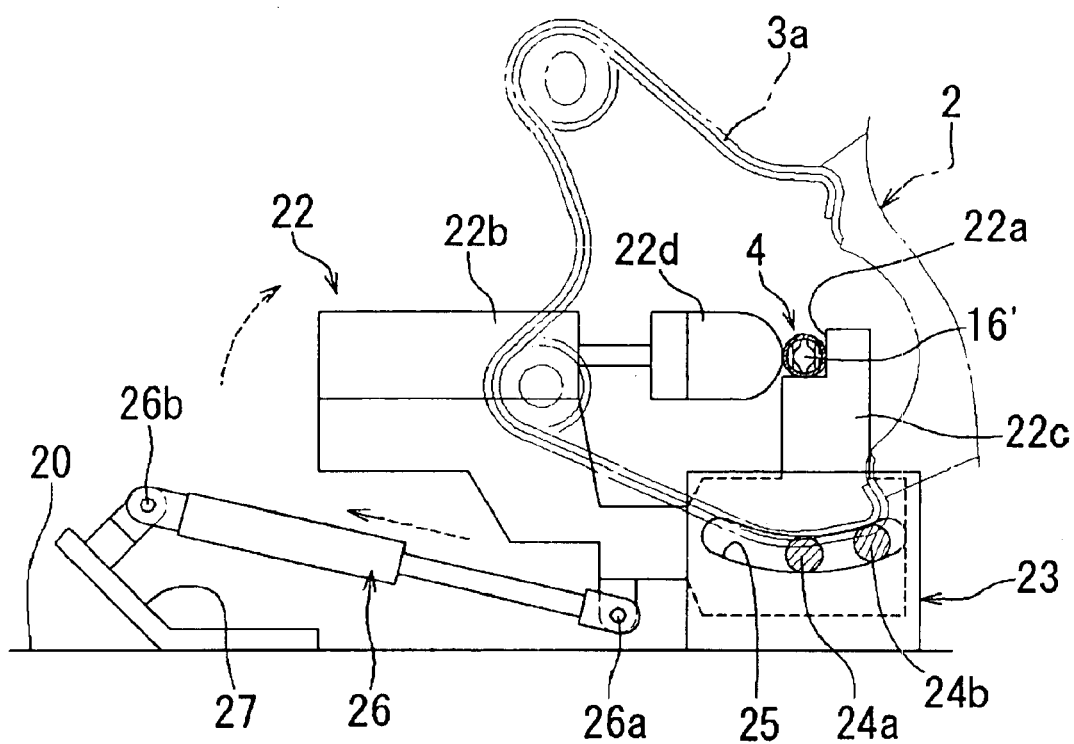
FIG. 3 is a side elevational view of second setting means of the apparatus.

Referring to FIG. 3, the second setting means 22 includes a supporting base 22c which has a driving cylinder 22b provided integrally with the supporting base 22c. The supporting base 22c has a step portion 22a which comprises vertical and horizontal surfaces, by which the axis of the supporting shaft 4 is adapted to be supported. The driving cylinder 22b is adapted to push the axis of the supporting shaft 4, which is supported by the step portion 22a, against the vertical surface of the step portion 22a of the supporting base 22c from a side which is opposed to the vertical surface of the step portion 22a. The driving cylinder 22b is provided at a tip end of a rod thereof with a pushing head 22d having a knurled nonskid surface which contacts the axis of the supporting shaft 4.

The second setting means 22 is mounted through stand bases 23 to the receiving base 20 so as to be swingable. In the illustrated embodiment, the supporting base 22c of the second setting means 22 has supporting pins 24a, 24b projecting from both sides thereof. The stand bases 23 are mounted on the receiving base 20 and spaced apart from each other in a direction perpendicular to a sheet of FIG. 3. The stand bases 23 have circular arc-shaped guide grooves 25 into which the supporting pins 24a, 24b of the supporting base 22c are inserted so as to be slidable along the guide grooves 25 of the stand bases 23, whereby the second setting means 22 can be swung along the guide grooves 25 of the stand bases 23 on the receiving base 20.

The second setting means 22 is coupled to a driving cylinder 26 which is adapted to generate a force to such an extent that the second setting means 22 having the axis of the supporting shaft 4 pinched and held between the step portion 22a of the supporting base 22c and the driving cylinder 22b is swung but the actuating shafts 16, 16' of the locking mechanisms 1, 1' which are connected to the supporting shaft 4 are not rotated. When the second setting means 22 having clamped and held the supporting shaft 4 is swung in a predetermined direction by the driving cylinder 26, the supporting shaft 4 is rotated by an allowed rotational amount relative to the actuating shafts 16, 16' in a direction opposite to such a direction that the supporting shaft 4 is shifted relative to the actuating shaft 16' of the locking mechanism 1' from a predetermined engaged point between the supporting shaft and the actuating shaft 16' of the locking mechanism 1'.

The driving cylinder 26 is connected at a rod end thereof to the supporting base 22c by a pin 26a, and connected at a rear end thereof, via a pin 26b, to a bracket plate 27 which stands up from the receiving base 20, whereby the driving cylinder 26 is provided between the supporting base 22c and the bracket plate 27. An attitude of the supporting base 22c is changed according to extension and contraction of the rod of the driving cylinder 26. The driving cylinders 22b, 26 are coupled to compressors so as to be actuated by compressed air from the compressors.

In order to construct the apparatus according to the present invention, constructions of the locking means 1, 1', and constructions of the other end portion 4b of the supporting shaft 4 and the actuating shaft 16' of the locking mechanism 1', in which the other end portion 4b of the supporting shaft 4 and the actuating shaft 16' of the locking mechanism 1' are rotatable to each other at an angle of a few degrees, are important factors. While these constructions are discussed in the portion "Description of the Related Art" of this application, the description of them will be repeated hereinafter in order to facilitate understanding of the present invention. Incidentally, components that are substantially similar to the components described in the portion "Description of the Related Art" are denoted by the same reference numerals. The description of them will not be repeated.

Figure 24:
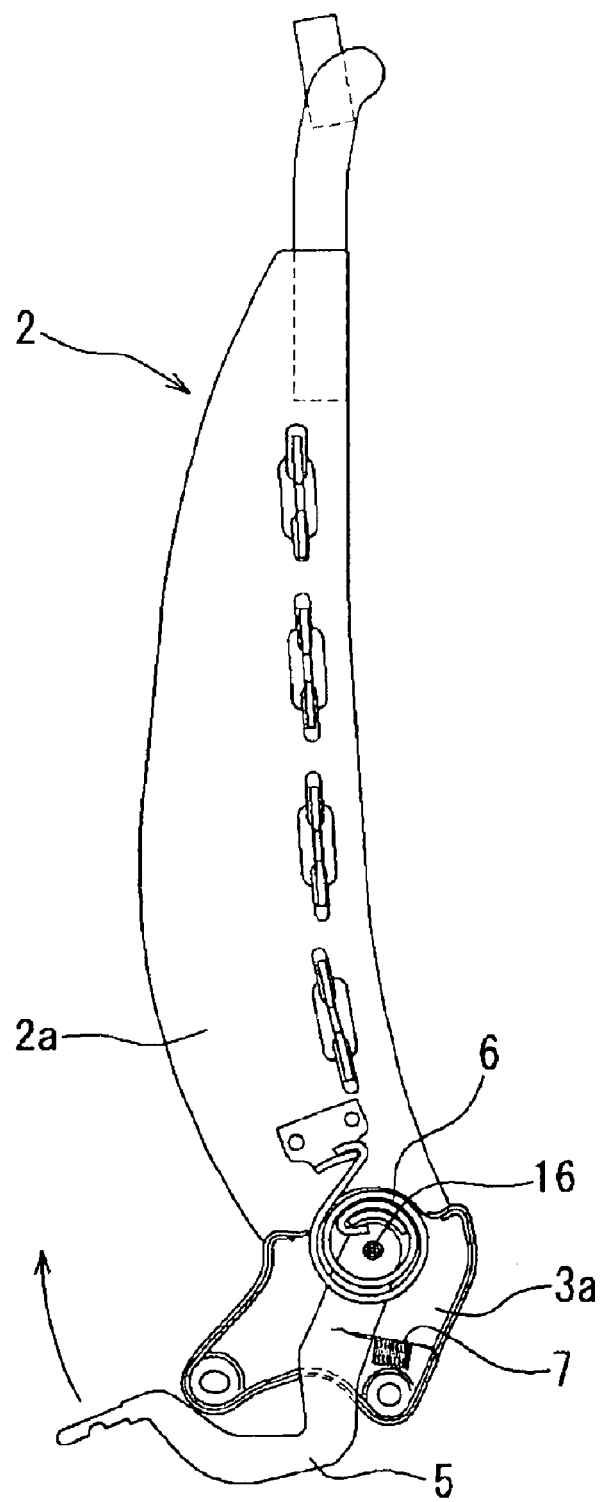
FIG. 24 is a side view of the seat back frame shown in FIG. 23.

Like the locking mechanism shown in FIG. 24, each of the locking mechanisms 1, 1' comprises a housing 10, a cover plate 11, locking gears 12, 13, 14 having gear teeth 12b, 13b, 14b provided at regions of peripheries thereof, a cam 15 for causing the locking gears 12–14 to be displaced, spiral springs 17a, 17b, 17c for urging and supporting the cam 15, a guide plate 18 for inducting the locking gears 12–14, and a ring-like cover 19 for causing the housing 10 and the cover plate 11 to be combined with each other in a face-to-face relation. The components making up the locking mechanism 1 are arranged in an order reverse to the arranging order of the components making up the locking mechanism 1'.

Figure 4:
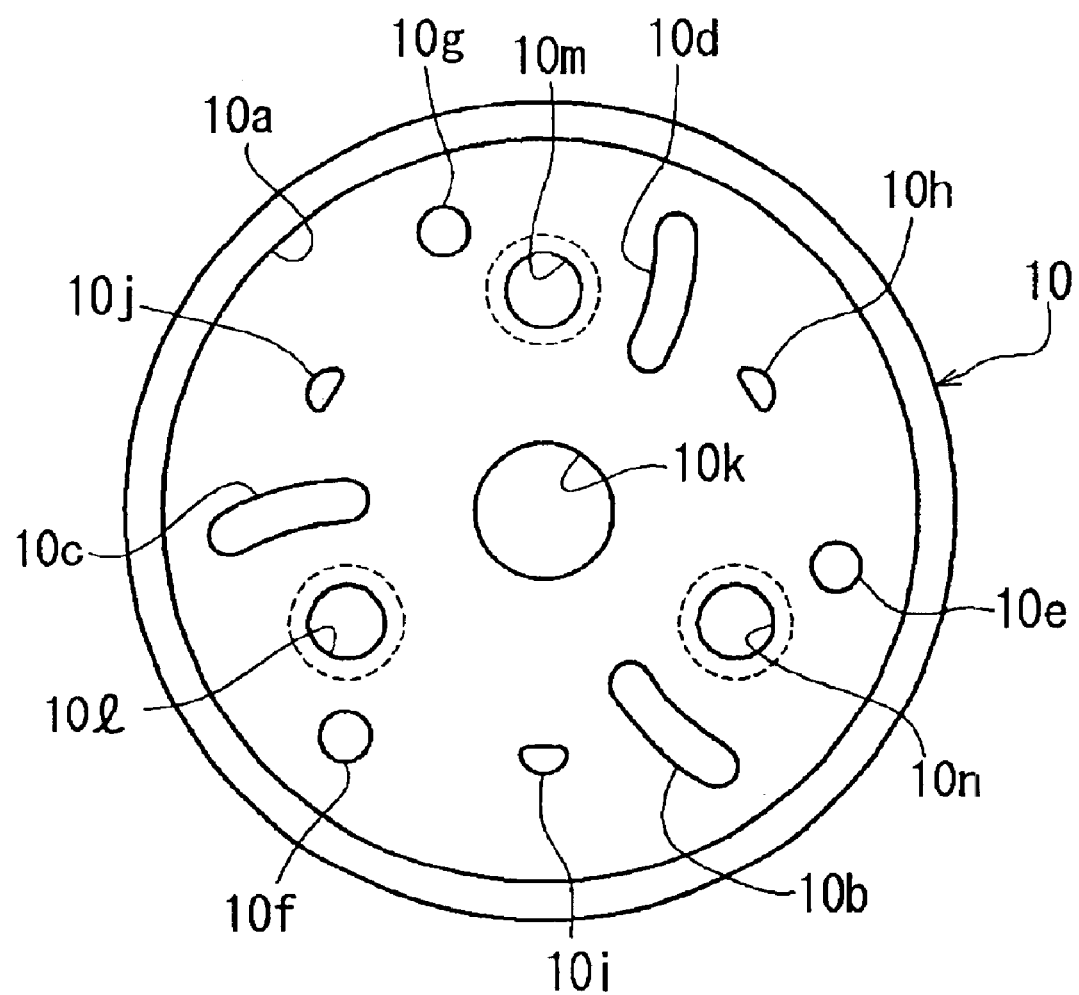
FIG. 4 is a side elevational view of a housing being one of elements making up one of locking mechanisms which are provided at the seat back frame shown in FIG. 1, and showing an interior of the housing.

Referring to FIG. 4, the housing 10 is formed in a substantially disk-shape and has an annular wall 10a. The housing 10 is provided on an inner surface of a plate portion thereof with guide blocks 10b, 10c, 10d for supporting the locking gears from one sides so as to allow the locking gears to be slid, supporting pins 10e, 10f, 10g for supporting the locking gears so as to allow the locking gears to be rotatable around the supporting pins 10e–10g, and supporting pins 10h, 10i, 10j to which innermost ends of the spiral springs are to be fastened. Further, the housing 10 has a bearing hole 10k formed in a central region of the plate portion thereof, through which the actuating shaft penetrating the cam is inserted. Provided on an outer surface of the plate portion of the housing 10 are hollow projections 10l, 10m, 10n which are to be welded to the bracket of the seat cushion frame.

Figure 5:
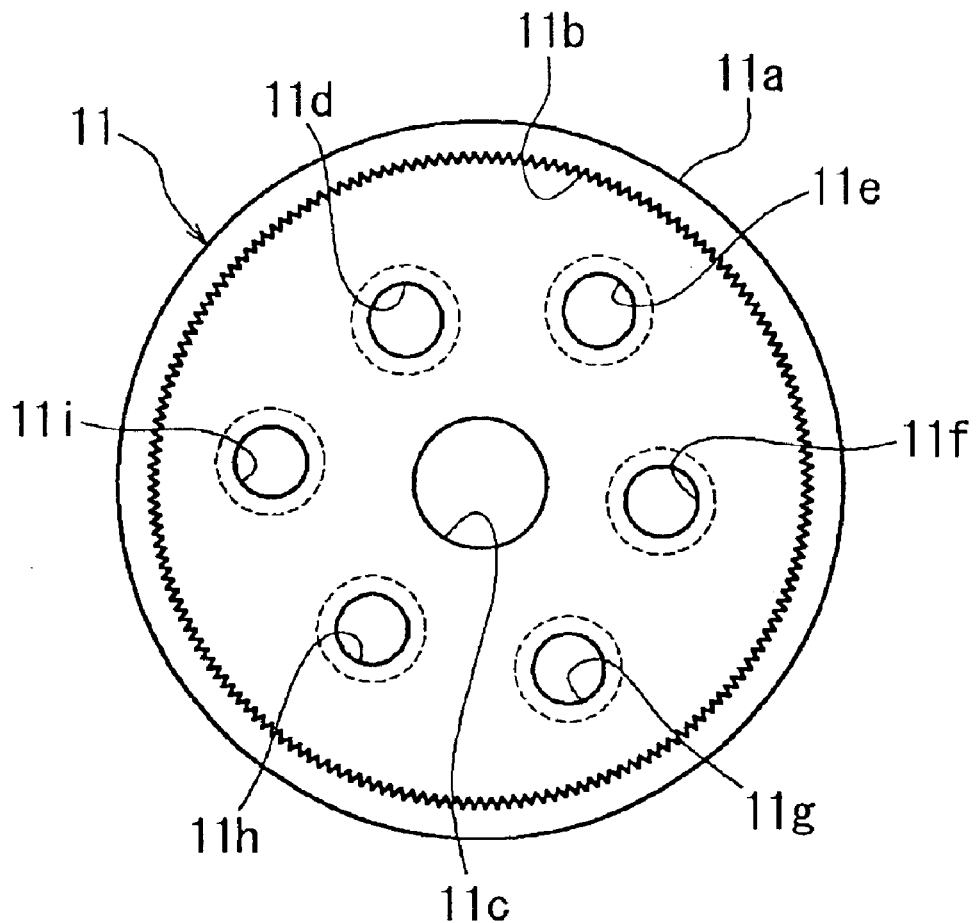
FIG. 5 is a side elevational view of a cover plate being one of the elements making up the locking mechanism, and showing an interior of the cover plate.

Referring to FIG. 5, the cover plate 11 is formed in a substantially disk-shape and has an annular wall 11a. A diameter of the annular wall 11a of the cover plate 11 is smaller than that of the annular wall 10a of the housing 10, whereby the cover plate 11 can be movable relative to the housing 10. The annular wall 11a of the cover plate 11 has gear teeth 11b provided around an inner periphery thereof. The cover plate 11 has a bearing hole 11c formed in a central region of a plate portion thereof, through which the actuating shaft is inserted. Provided on an outer surface of the plate portion of the cover plate 11 are hollow projections 11d, 11e, 11*f*, 11*g*, 11*h*, 11*i* which are to be welded to the side frame section of the seat back frame.

Figure 6:
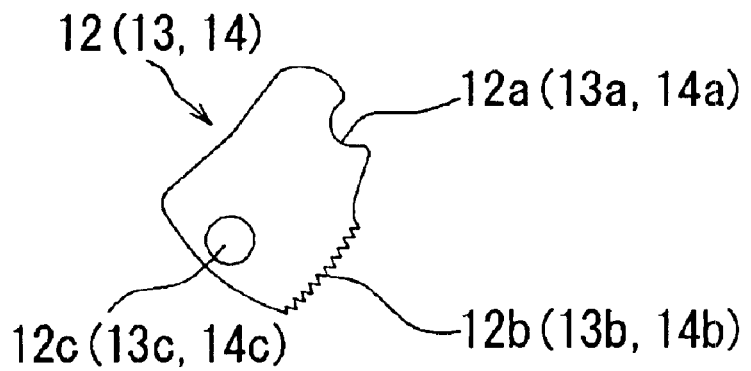
FIG. 6 is a side elevational view of a locking gear being one of the elements making up the locking mechanism.

Referring to FIG. 6, the locking gears 12, 13, 14 have semicircular notches 12*a*, 13*a*, 14*a* and are formed in substantially square shapes so as to be slidably supported by the guide blocks from the one sides. The locking gears 12, 13, 14 are provided at the regions of the peripheries thereof with the gear teeth 12*b*, 13*b*, 14*b* which are disengageably meshed with the gear teeth of the cover plate. Further, the locking gears 12, 13, 14 have inducting pins 12*c*, 13*c*, 14*c* provided on plate surfaces thereof, which are to be inserted in guide holes of the guide plate which will be discussed hereinafter.

Figure 7:
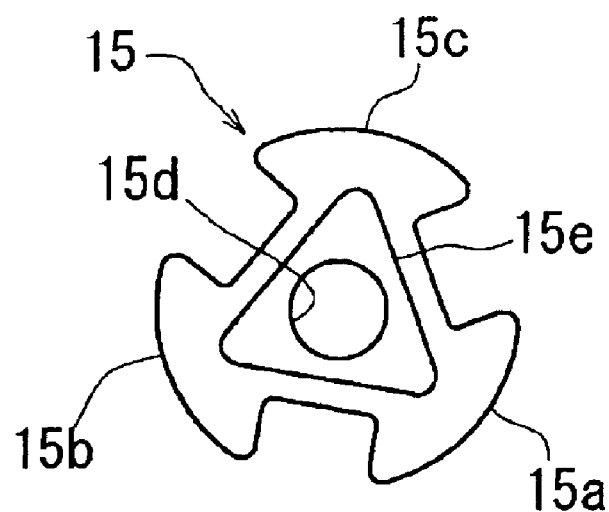
FIG. 7 is a side elevational view of a cam being one of the elements making up the locking mechanism.

Referring to FIG. 7, the cam 15 includes three protruding jaws 15*a*, 15*b*, 15*c* having curved surfaces which can push the locking gears and cause the locking gears to be retracted. Further, the cam 15 is provided at a central portion thereof with a substantially triangular-shaped boss portion 15*e* that is to be fitted in a substantially triangular-shaped through-hole of the guide plate which will be discussed hereinafter. The boss portion 15*e* is formed with a through-hole 15*d* through which the actuating shaft is inserted and fixed.

Figure 8:
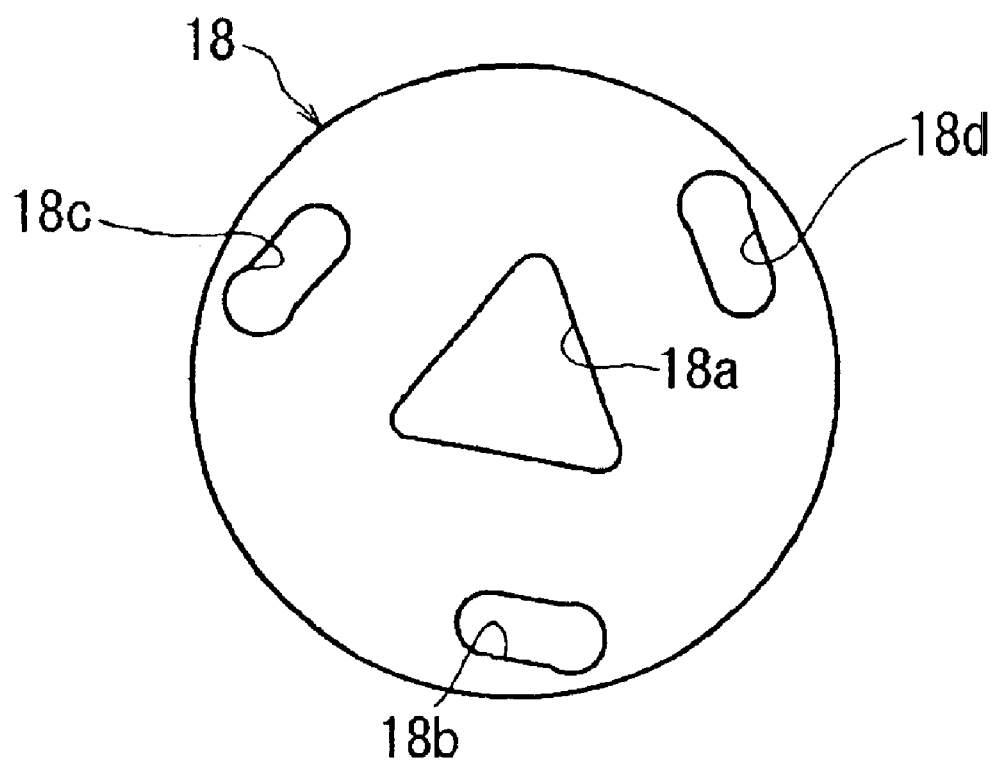
FIG. 8 is a side elevational view of a guide plate being one of the elements making up the locking mechanism.

Referring to FIG. 8, the guide plate 18 comprises a small-sized circular plate which can be arranged within the cover plate. The guide plate 18 has the substantially triangular-shaped through-hole 18*a* formed in a central portion thereof, in which the boss portion of the cam is fitted. Further, the guide plate 18 has the guide holes 18*b*, 18*c*, 18*d* which are formed in regions adjacent a periphery of the guide plate. The inducting pins of the locking gears are inserted in the guide holes 18*b*, 18*c*, 18*d*.

Figure 9:
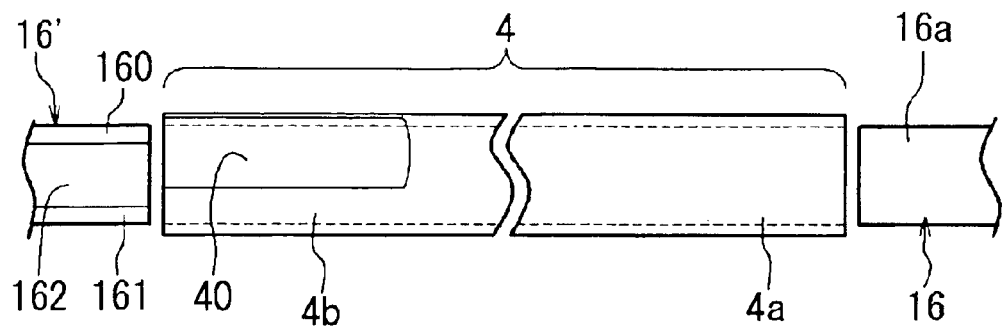
FIG. 9 is a view of assistance in explaining a supporting shaft which is assembled to the seat back frame of FIG. 1, and actuating shafts of the locking mechanisms.
Figure 25:
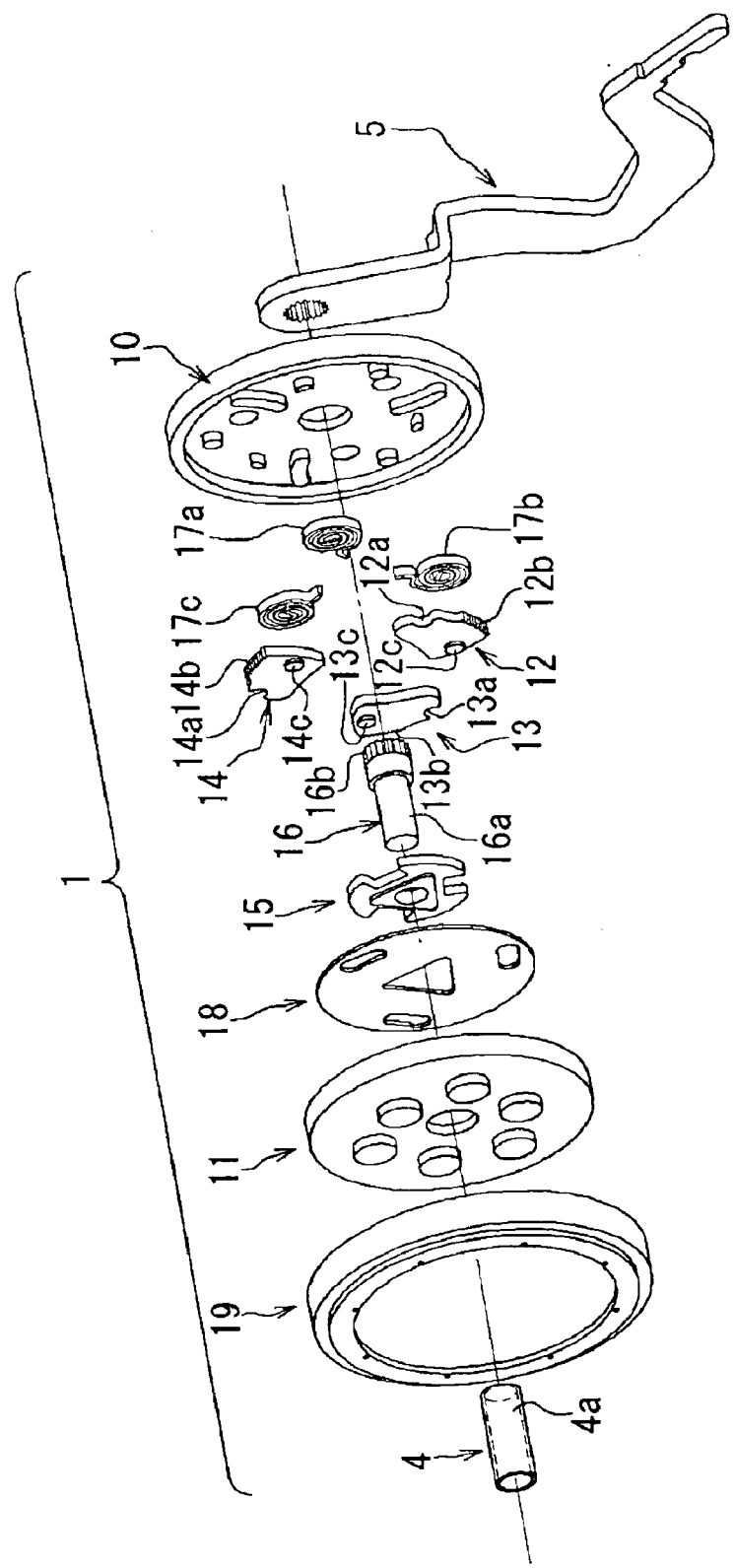
FIG. 25 is an exploded perspective view of a locking mechanism provided at the left side of the seat back frame shown in FIG. 23 (at the right side in FIG. 23)
Figure 26:
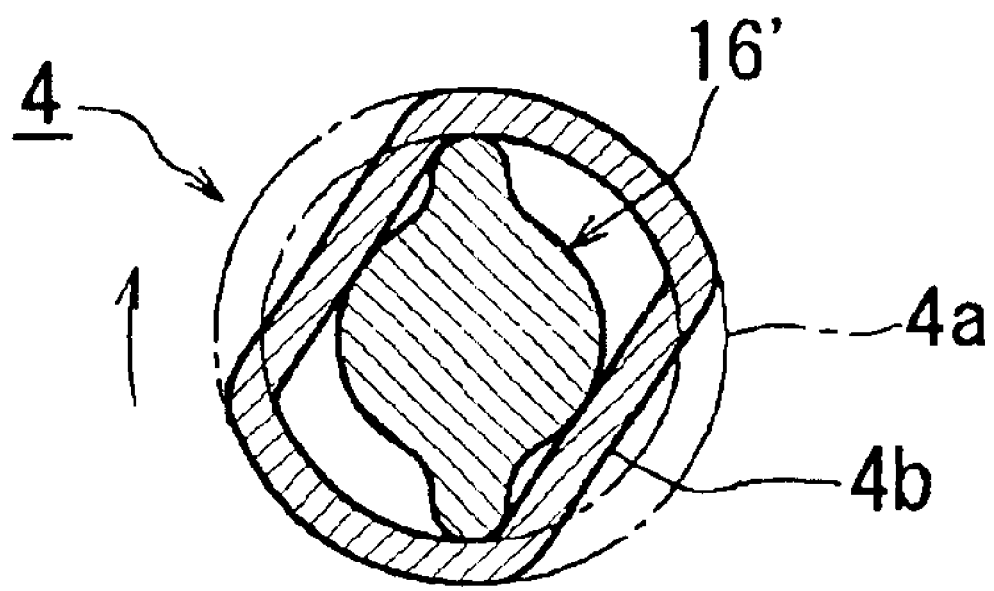
FIG. 26 is a view of assistance in explaining one example of conditions where an actuating shaft of the locking mechanism and a supporting shaft are coupled to each other so as to be rotatable relative to each other at an angle of a few degrees in the seat back of FIG. 23.

Referring to FIG. 9, the actuating shaft 16 of the locking mechanism 1 is formed in a round bar-shape. An inner end portion 16*a* of the actuating shaft 16 is fitted in the one end portion 4*a* of the supporting shaft 4 and is to be welded to the one end portion 4*a* of the supporting shaft 4. An outer end portion 16*b* of the actuating shaft 16 is grooved and fitted into a base portion of an operating lever 5 (see FIG. 25).

Figure 10:
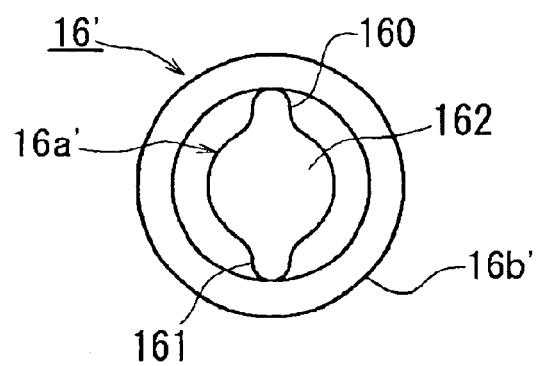
FIG. 10 is a view of assistance in explaining one end portion of an actuating shaft of a locking mechanism provided at the right side of the seat back frame of FIG. 1 (at the right side in FIG. 1)

Referring to FIG. 10, the actuating shaft 16' of the locking mechanism 1' has an axial portion 162, an inner end portion 16*a*', two flange portions 160, 161 provided at regions of the inner end portion 16*a*' which are opposite to each other, and an outer end portion 16*b*' formed in a substantially round bar shape and inserted through the bearing hole 10*i* of the housing 10.

Figure 11:
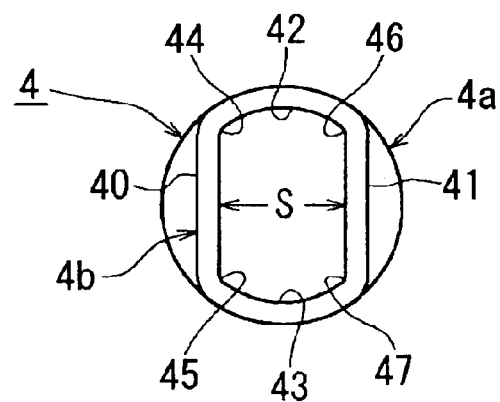
FIG. 11 is a view of assistance in explaining one end portion of the supporting shaft to which the actuating shaft of FIG. 10 is coupled.

Referring to FIG. 11, the other end portion 4*b* of the supporting shaft 4 is deformed so as to have a substantially elliptic shape in cross-section, and comprises a pair of flat wall sections 40, 41 which are opposed to each other and spaced apart from each other at an interval S, a pair of spaced apart circular arc-shaped wall sections 42, 42 interconnecting the flat wall sections 40, 41, corners 44, 46 between the flat wall sections 40, 41 and the circular arc-shaped wall section 42, and corners 45, 47 between the flat wall sections 40, 41 and the circular arc-shaped wall section 43.

The supporting shaft 4 is coupled to the actuating shaft 16' so as to be rotatable relative to the actuating shaft 16' at an angle of a few degrees, by causing the inner end portion 16*a*' of the actuating shaft 16', which is provided with the flange portions 160, 161, to be fitted in the other end portion 4*b* of the supporting shaft 4 which is deformed so as to have the flat wall sections 40, 41. Taking into a consideration a correlation between the shape of the other end portion 4*b* of the supporting shaft 4 and the inner end portion 16*a*' of the actuating shaft 16', the rotation angle may be set to an angle which is more than at least one pitch between the gear teeth of the cover plate 11 and the gear teeth of the locking gears 12–14 which are engaged with one another and, specifically, may be set to an angle of about 2–20 degrees and preferably set to an angle of about 7–9 degrees.

Figure 12:
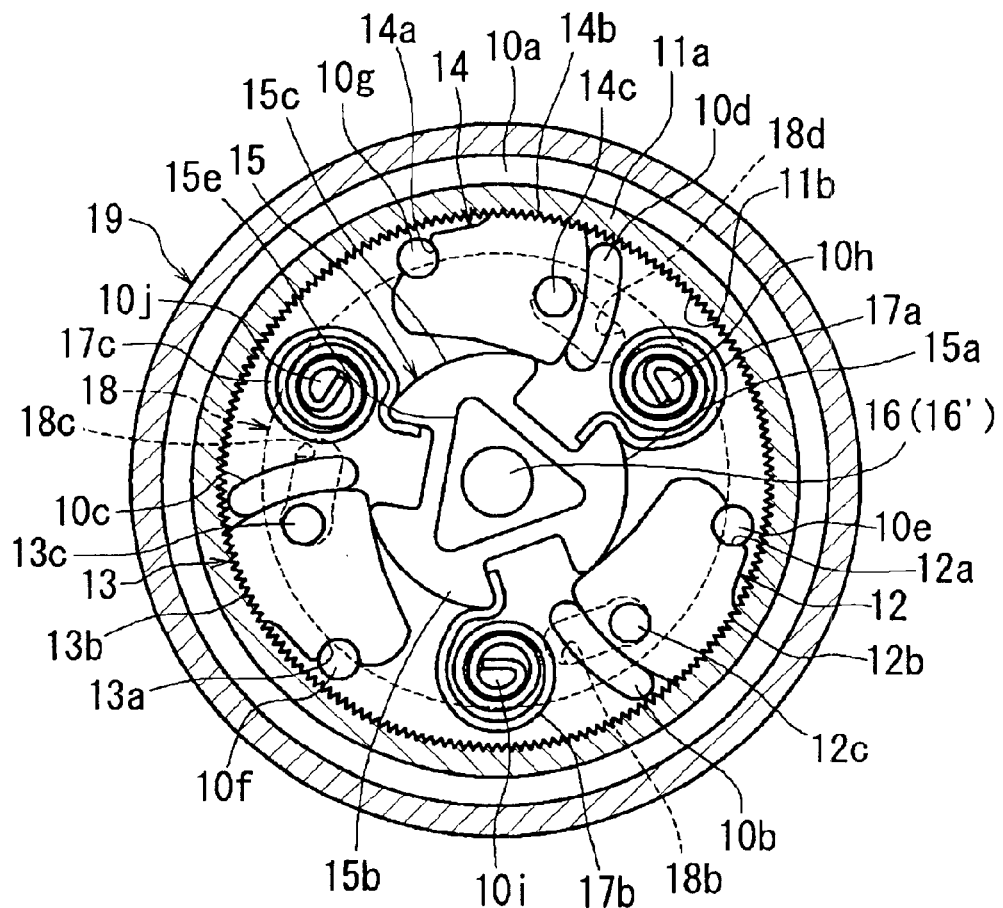
FIG. 12 is a view of assistance in explaining the locking mechanism that is provided at the seat back frame of FIG. 1 and is in an locked condition.

Referring to FIG. 12, the cam 15 is mounted to the actuating shaft 16 (16') for rotation therewith, by causing the actuating shaft to be inserted through the bearing hole 15*d* of the cam 15. The outer end portion of the actuating shaft 16 (16') is inserted through the bearing hole 10*k* (see FIG. 4) of the housing 10, whereby the cam 15 is arranged at the central portion of the housing 10. The locking gears 12–14 are arranged within the housing 10 so as to be slidably supported at the one sides thereof by the guide blocks 10*b*–10*d* and so as to be pivoted around the supporting pins 10*e*–10*g*.

The spiral springs 17*a*–17*c* are fastened at the innermost end portions thereof to the supporting pins 10*h*–10*j* and are engaged at outermost end portions thereof with the protruding pawls 15*a*–15*c* of the cam 15, whereby the cam 15 is always urged by the spiral springs 17*a*–17*c* in such a manner to cause the gear teeth of the locking gears 12–14 to be meshed with the gear teeth 11*b* of the cover plate 11.

The locking gears 12–14 are pivotally supported by the guide blocks 10*b*–10*d* and the supporting pins 10*e*–10*g*, with the inducting pins 12*c*–14*c* thereof being inserted in the guide holes 18*b*–18*d* of the guide plate 18. The guide plate 18 is secured to an assembly comprising the cam 15 and the actuating shaft 16 (16') for rotation therewith, by causing the boss portion 15*e* of the cam 15 to be fitted in the through-hole 18*a* of the guide plate 18.

The cover plate 11 is combined with the housing 10 in a-face-to-face relation so as to be rotatable independently from the housing with the bearing hole 11*c* thereof receiving the inner end portion of the actuating shaft 16 (16') and with the annular wall 11*a* thereof being received within the annular wall 10*a* of the housing 10. The ring-like cover 19 is mounted on an outside of the housing 10 and holds the housing 10 so as to allow the cover plate 11 to be rotatable independently from the housing 10.

Figure 13:
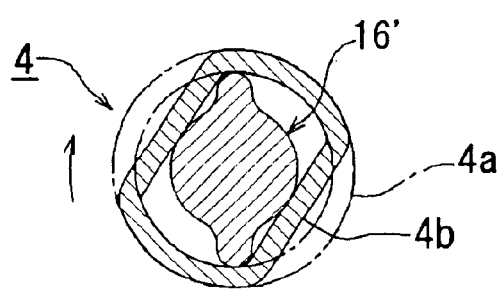
FIG. 13 is a sectional view of assistance in explaining a condition where the actuating shaft and the supporting shaft are normally engaged with each other, taken on a plane indicated in FIG. 1 by a line A—A.
Figure 14:
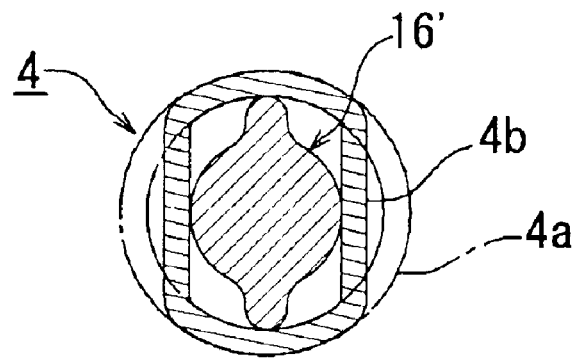
FIG. 14 is a view of assistance in explaining one example of conditions where the actuating shaft of FIG. 10 and the supporting shaft of FIG. 11 are shifted relative to each other.
Figure 15:
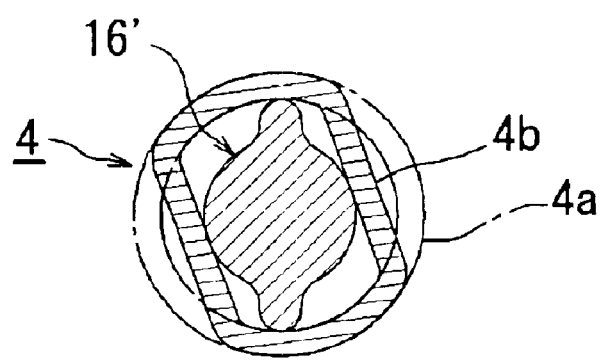
FIG. 15 is a view of assistance in explaining another example of the conditions where the actuating shaft of FIG. 10 and the supporting shaft of FIG. 11 are shifted relative to each other.
Figure 16:
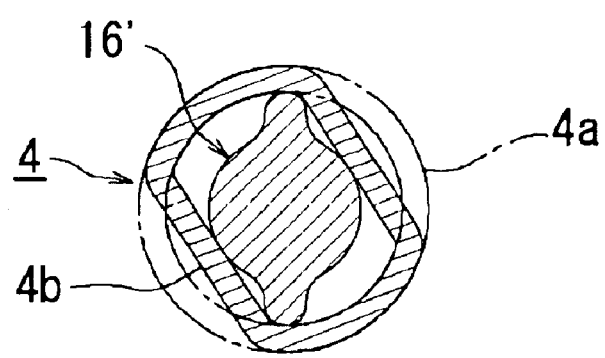
FIG. 16 is a view of assistance in explaining still another example of the conditions where the actuating shaft of FIG. 10 and the supporting shaft of FIG. 11 are shifted relative to each other.

As discussed above, the supporting shaft 4 is coupled to the inner end portions of the actuating shafts 16, 16' by causing the inner end portions of the actuating shafts 16, 16', which are penetrated through the side frame sections 2*a*, 2*b* and projected inwardly so as to be aligned with each other when the locking means 1, 1' are mounted to the outer sides of the lower portions of the side frame sections 2*a*, 2*b*, to be fitted in the inner end portions of the supporting shaft 4. In a condition where the supporting shaft 4 is coupled to the actuating shafts 16, 16', there is a possibility that the end portion 4*b* of the supporting shaft 4 and the actuating shaft 16' will be normally engaged with each other at a rotation-starting point of the operating lever as shown in FIG. 13 or the end portion 4*b* of the supporting shaft 4 and the actuating shaft 16' will be shifted from each other as shown in FIGS. 14 to 16.

After the supporting shaft 4 is coupled to the actuating shafts 16, 16' of the locking mechanisms 1, 1' and the seat back frame 2 is subjected to necessary processing, the seat back frame 2 is carried and laid on the receiving base 20 as shown in FIG. 2. In this condition, the first setting means 21 is actuated, whereby the side frame sections 2*a*, 2*b* of the seat back frame 2 are held from insides and outsides thereof by the dampers 21*a*, 21*b*, the brackets 3*a*, 3*b* are held by the pushers 21*c*, 21*d*, and the upper section 2*c* of the seat back frame 2 is held by the pusher 21e. Thus, the seat back frame 2 is positioned on the receiving base 20.

Next, the driving cylinder 22b (see FIG. 3) of the second setting means 22 is actuated, whereby the supporting shaft 4 received by the horizontal and vertical surfaces of the step portion 22a of the supporting base 22c as shown in FIG. 3 is pushed against the step portion 22a by the head 22d of the driving cylinder 22b. Thus, the supporting shaft 4 is positioned and held by the second setting means 22. In this condition, there is also a possibility that the end portion 4b of the supporting shaft 4 and the actuating shaft 16' will be shifted from each other (see FIGS. 14–16), without being normally engaged with each other as shown in FIG. 13.

Figure 17:
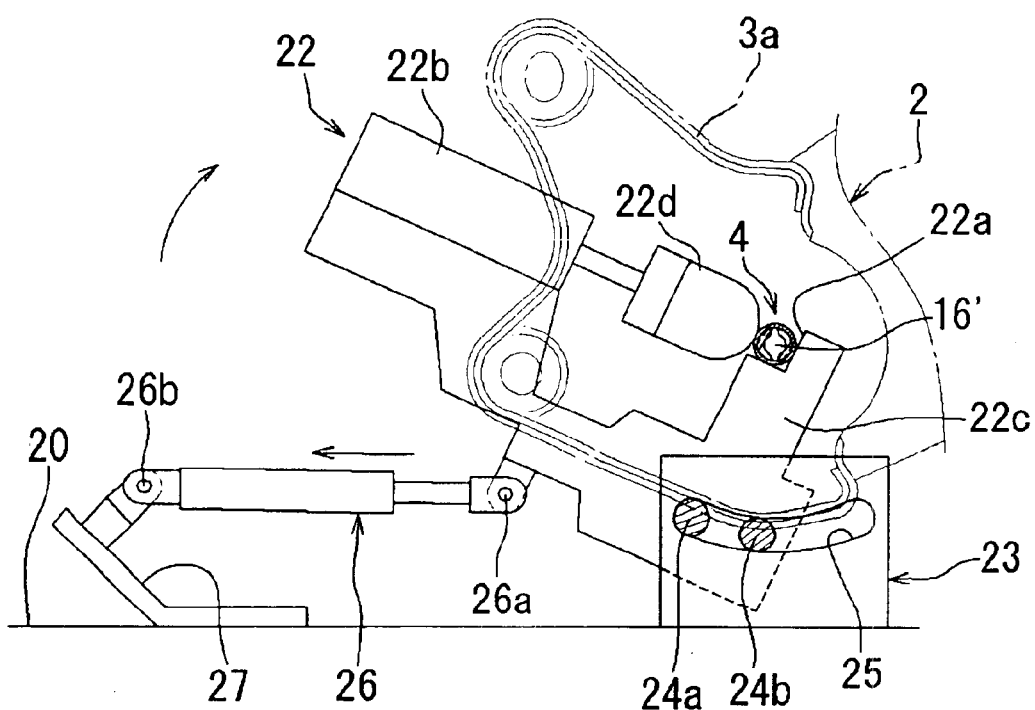
FIG. 17 is a side view of assistance in explaining the operation of the setting means shown in FIG. 3.

In a condition where the seat back frame 2 and the supporting shaft 4 are positioned on the receiving base 20 and the supporting base 22c, respectively, the driving cylinder 26 is actuated in such a manner that the rod of the driving cylinder 26 is contracted as shown in FIG. 17. According to the actuation of the driving cylinder 26, the supporting base 22c of the second setting means 22 which has the supporting shaft 4 remaining held between the step portion 22a of the supporting base 22c and the driving cylinder 22b is swung.

At this time, the driving cylinder 26 produces a force to the extent that the actuating shafts 16, 16' are not rotated. That is, the driving cylinder 26 is adapted to be actuated by air pressure that is lower than spring rate exerted by the coil springs 17a–17c that elastically urge the cam 15. Therefore, for example, when the end portion 4b of the supporting shaft 4 and the actuating shaft 16' are in a normally engaged state at the rotation-starting point of the operating lever (see FIG. 13), the rod of the driving cylinder 26 is adapted not to be contracted.

When the end portion 4b of the supporting shaft 4 and the actuating shaft 16' are not in the normally engaged state (see FIGS. 14–16), the rod of the driving cylinder 26 is contracted so as to cause the supporting base 22c of the second setting means 22 to be swung by a rate corresponding to an angular deviation between the end portion 4b of the supporting shaft 4 and the actuating shaft 16'. The stroke of the driving cylinder 26 is previously set so as to cause the supporting base 22c to be swung upwardly in such a manner that the axis of the supporting shaft 4 is rotated by the allowed rotational amount relative to the actuating shaft 16' of the locking mechanism 1' in a direction opposite to such a direction that the end portion 4b of the supporting shaft 4 is shifted from the actuating shaft 16'.

Thus, even if the end portion 4b of the supporting shaft 4 and the actuating shaft 16' are in any coupled condition, the coupled state between the end portion 4b of the supporting shaft 4 and the actuating shaft 16' can be securely compensated in such a manner that the end portion 4b of the supporting shaft 4 and the actuating shaft 16' are changed into the normally engaged state at the rotation-starting point of the operating lever. In the normally engaged condition, the one end portion 4a of the supporting shaft 4 can be securely welded to the actuating shaft 16.

In the reclining seat provided at the both sides thereof with the locking mechanisms 1, 1' which the supporting shaft 4 interconnects as described above, the cams 15 are always urged by the spiral springs 17a–17c so as to cause the locking gears 12–14 to be forcedly meshed with the gear teeth 11b of the cover plate 11 as shown in FIG. 12.

Figure 18:
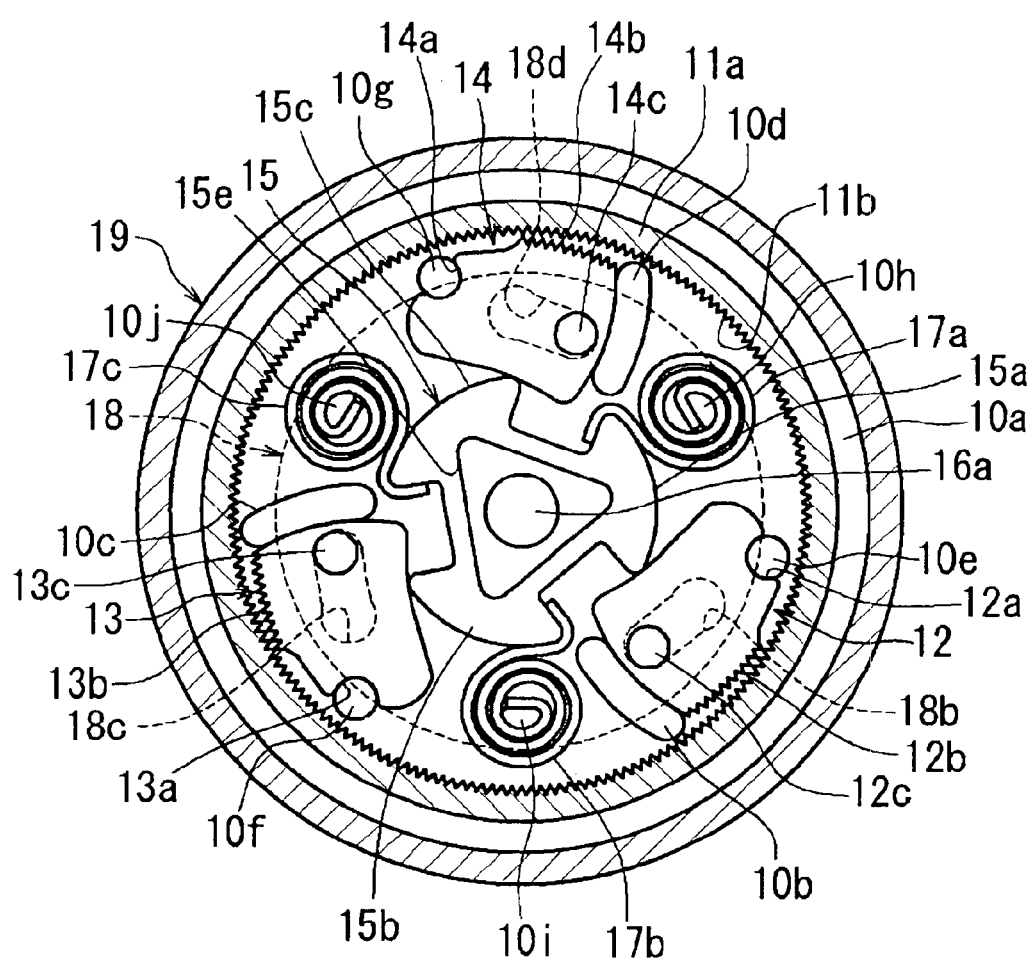
FIG. 18 is a view of assistance in explaining the locking mechanism of FIG. 12 that is in an unlocked condition.

When the operating lever 5 is pulled up so as to be rotated, the cams 15 are rotated together with the guide plates 18 against the actions of the spiral springs 17a–17c as shown in FIG. 18, whereby the guide holes 18b–18d of the guide plate 18 are moved while pulling the inducting pins 12c–14c of the locking gears 12–14. As a result, the locking gears 12–14 are moved so as to be disengaged from the gear teeth 11b of the cover plate 11. Further, the other end portion of the supporting shaft 4 is engaged with the actuating shaft 16', so that the locking mechanisms 1, 1' are synchronously operated at the moment.

The other end portion 4b of the supporting shaft 4 is coupled to the actuating shaft 16' of the locking mechanism 1' so as to be rotatable relative to the actuating shaft 16' at the angle of a few degrees. Therefore, even if any torsional force is applied to the supporting shaft 4, the other end portion 4b of the supporting shaft 4 can be shifted relative to the actuating shaft 16' of the locking mechanism 1', so that any force which tends to cause the cams 15 of the locking mechanisms 1, 1' to be actuated differentially from one another is not applied to the cams 15, and the locking gears 12–13 of the locking mechanisms 1, 1' and the gear teeth 11b of the cover plates 11 of the locking mechanisms 1, 1' are kept normally engaged with each other.

Figure 19:
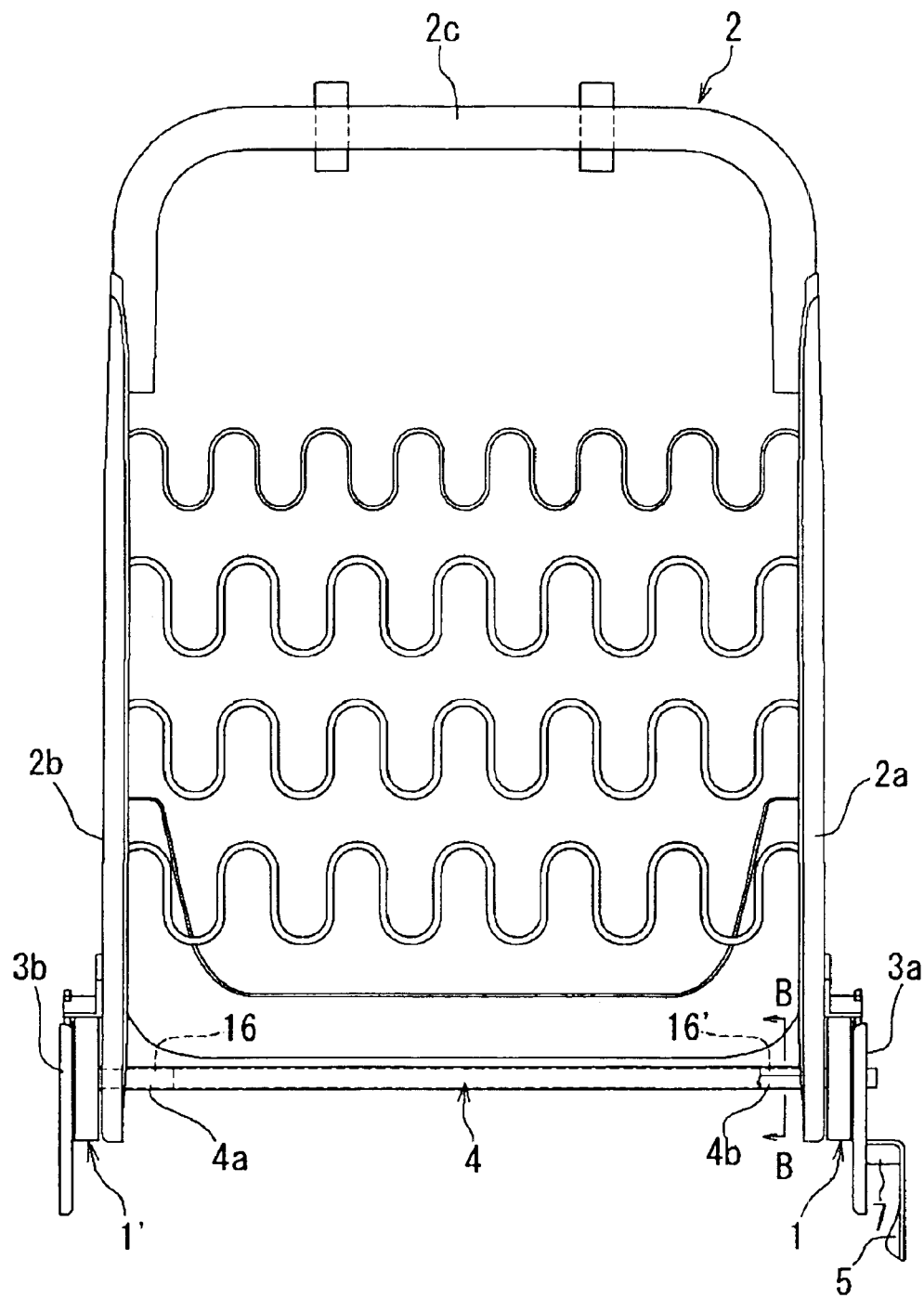
FIG. 19 is a front view of another example of the seat back frames which may be constructed using the apparatus according to the present invention.
Figure 20:
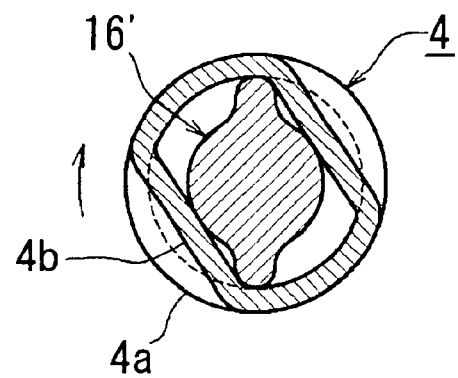
FIG. 20 is a view of assistance in explaining a condition where the actuating shaft and the supporting shaft are normally engaged with each other in the seat back frame of FIG. 19, taken on a plane indicated in FIG. 19 by a line B—B.

In the seat back frame according to the above-mentioned embodiment of the present invention, the right end portion of the supporting shaft 4 (the left end portion in FIG. 1) is coupled to the actuating shaft of the locking mechanism 1' so as to be rotatable relative to the actuating shaft of the locking mechanism 1' at the angle of a few degrees, and the left end portion of the supporting shaft 4 (the right end portion in FIG. 1) is rigidly welded to the actuating shaft of the locking mechanism 1. As shown in FIG. 19, the left end portion of the supporting shaft 4 (the right end portion in FIG. 19) may be coupled to the actuating shaft of the locking mechanism 1 so as to be rotatable relative to the actuating shaft of the locking mechanism 1 at the angle of a few degrees, and the right end portion of the supporting shaft 4 (the left end portion in FIG. 19) may be rigidly welded to the actuating shaft of the locking mechanism 1'.

Figure 21:
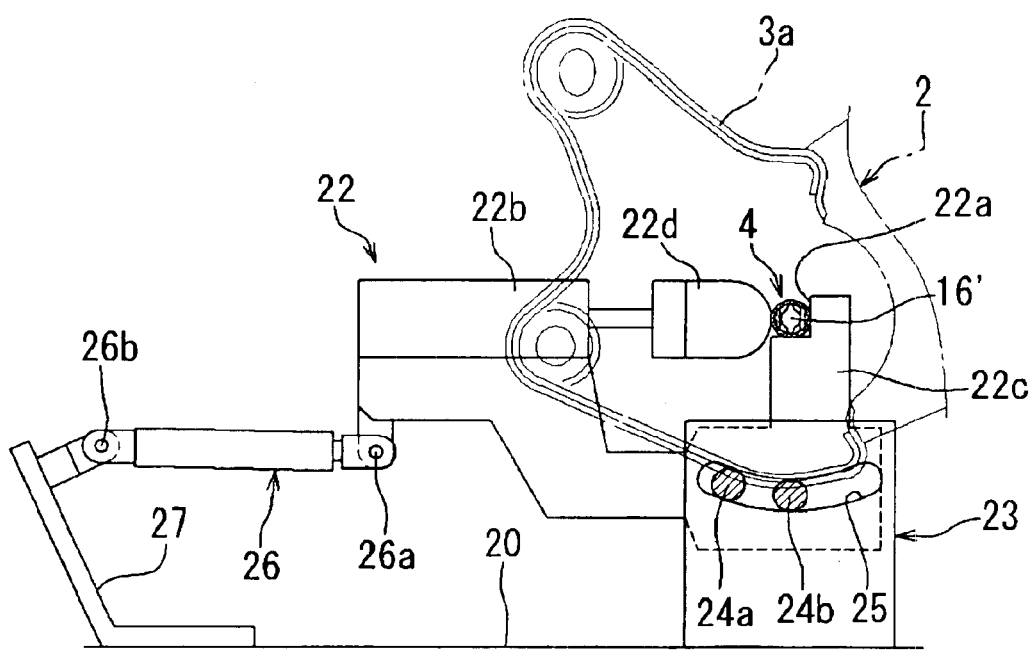
FIG. 21 is a side view of another second setting means which handles the seat back frame shown in FIG. 19.
Figure 22:
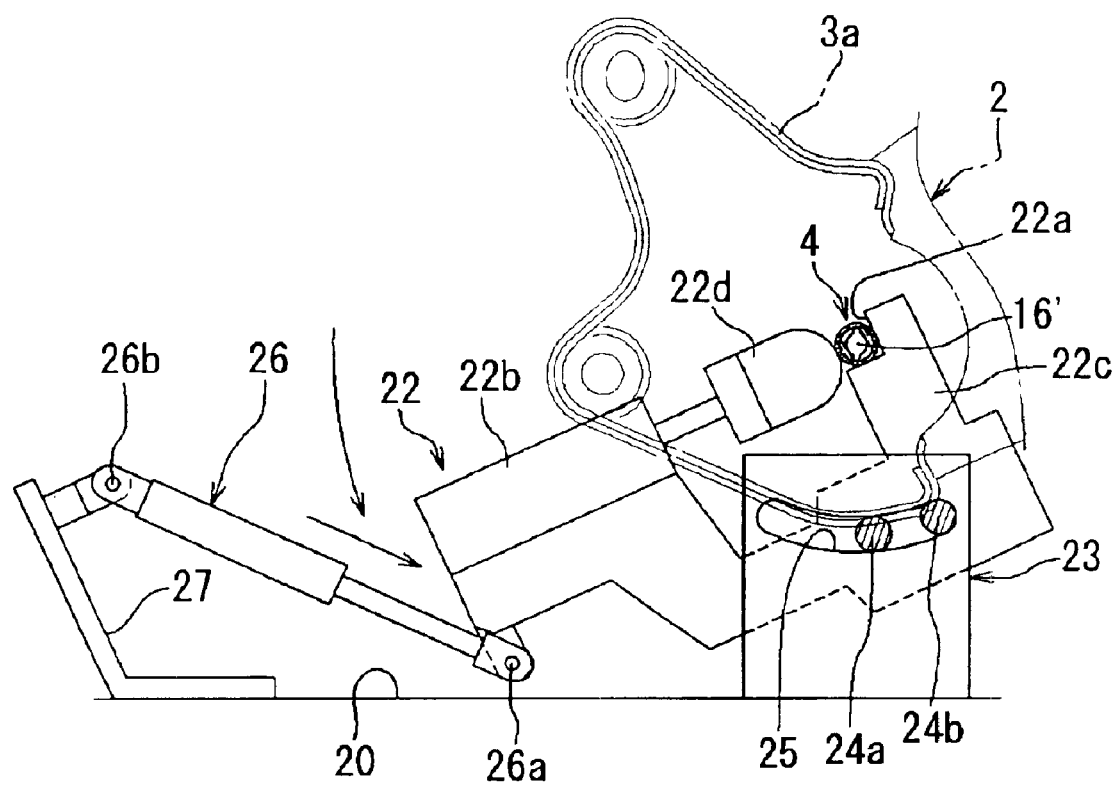
FIG. 22 is a side view of assistance in explaining the operation of the second setting means shown in FIG. 21.
Figure 23:
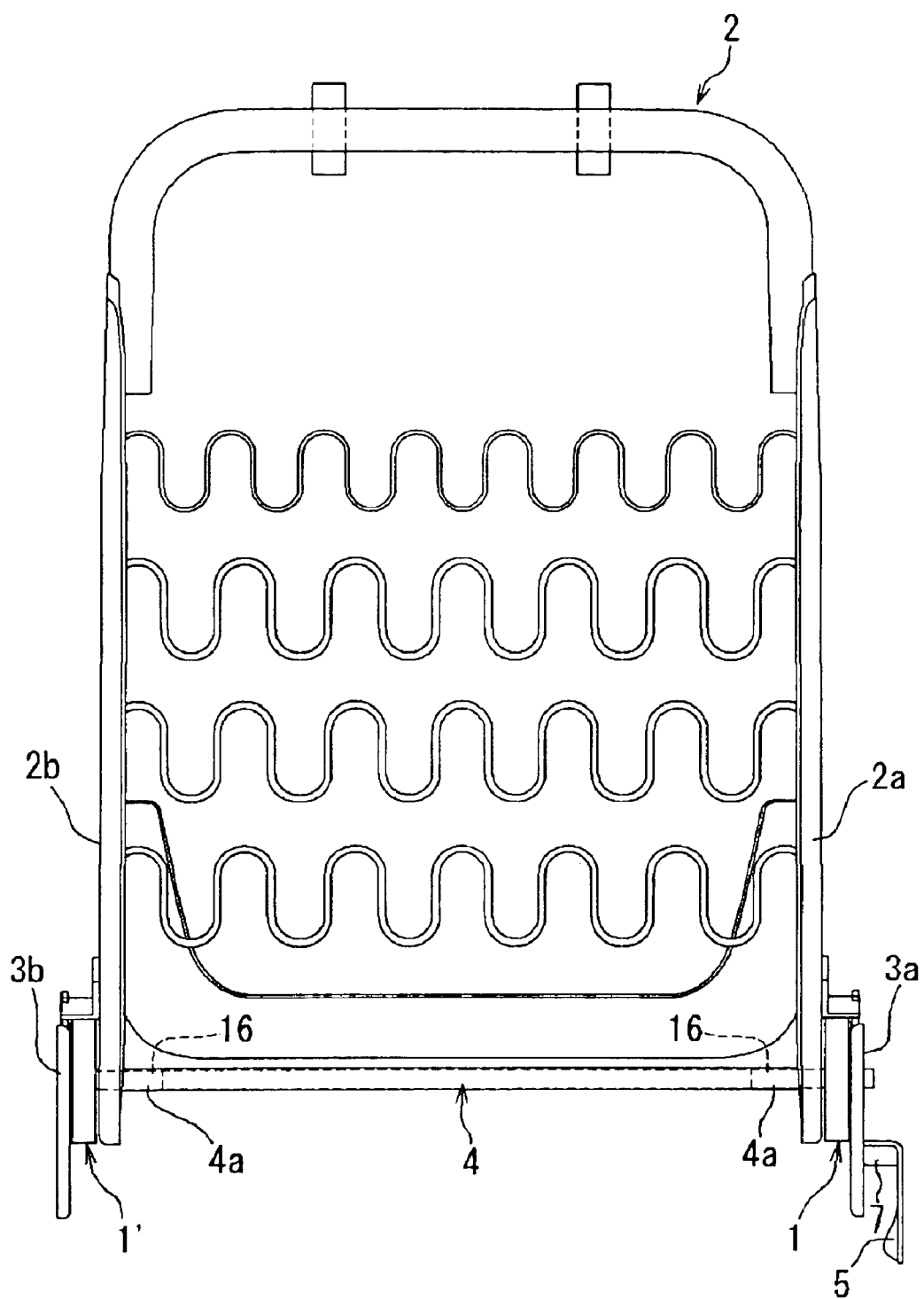
FIG. 23 is a front view of a seat back frame for a general reclining seat.

In this case, it is necessary to compensate a coupled condition between the end portion 4b of the supporting shaft 4 and the actuating shaft 16' by causing the supporting shaft 4 to be rotated in such a manner that the end portion 4b of the supporting shaft 4 and the actuating shaft 16' are engaged with each other at the rotation-starting point of the operating lever in an engaged condition which is the reversal of the engaged condition shown in FIG. 13. In order to comply with the compensation, as shown in FIGS. 21 and 22, there may be employed a driving cylinder 26', a rod of which is extended, to thereby cause the second setting means 22 to be swung downward.

Each of such locking mechanisms as described above is one example. There may be employed another locking means including a plurality of locking gears (Japanese patent application laid open under Provisionary Publication No. Hei. 8-253063). Also, there may be employed locking means including only one locking gear having a toothed portion, and a ring member having locking teeth, in which the toothed portion of the locking gear is adapted to be disengageably meshed with the locking teeth of the ring member (U.S. Pat. No. 4,103,970 and Japanese patent application laid open under Provisionary Publication No. Hei. 10-127398).

As described above, the apparatus according to the present invention includes the receiving base for allowing the seat back frame to be carried thereon in a laid state and adapted for serving as the base of the apparatus, and the second setting means for clamping and holding the supporting shaft coupled to the actuating shafts of the locking mechanisms, the second setting means being supported through the stand bases to the receiving base so as to be swung by the first driving cylinder in a condition where the second setting means clamps and holds the supporting shaft, and the first driving cylinder being adapted to develop the force to the extent that the supporting shaft held by the second setting means is rotated relative to the actuating shafts of the locking mechanisms but the actuating shafts are not rotated, when the first driving cylinder causes the second setting means to be swung, so that when the second setting means is swung in the predetermined direction by the first driving cylinder, the supporting shaft is rotated by an allowed rotational amount relative to the actuating shafts in the direction opposite to such a direction that the supporting shaft is shifted from a predetermined engaged point between the deformed end of the supporting shaft and the deformed end portion of the one of the actuating shafts, whereby the deformed end of the supporting shaft can be normally engaged with the deformed end portion of the one of the actuating shafts at the predetermined engaged point. Therefore, even if the deformed end portion of the supporting shaft and the deformed end portion of the one of the actuating shaft are coupled to each other in any coupled state, the coupled state can be positively compensated in such a manner that engagement between the deformed end portion of the supporting shaft and the deformed end portion of the one of the actuating shaft is accomplish at the rotation-stating point of the operating lever, and the welding of the other end portion of the supporting shaft to the other of the actuating shafts can be positively carried out.

Also, in the apparatus according to the present invention, the first setting means comprises a plurality of the dampers for clamping and holding the seat back frame on the receiving base from the periphery of the seat back frame. Therefore, the seat back frame can be stably positioned on the receiving base with the simple construction.

Furthermore, in the apparatus according to the present invention, the second setting means comprises the supporting base having the step portion which comprises the vertical surface and the horizontal surface, the axis of the supporting shaft being adapted to be received by the vertical and horizontal surfaces, and the second driving cylinder for pressing the axis of the supporting shaft against the vertical surface of the supporting base, the second driving cylinder being provided integrally with the supporting base. Therefore, the supporting shaft can be stably positioned against the step portion of the supporting base with the simple construction.

Also, in the apparatus according to the present invention, the supporting base of the second setting means has the supporting pins projecting from the sides thereof, the stand bases have the circular-arc shaped guide grooves formed in the sides thereof, the supporting pins of the supporting base are received in the guide grooves of the stand bases so as to be slid along the guide grooves, whereby the second setting means having held the axis of the supporting shaft can be swung, and the first driving cylinder which generates the force to the extent that the supporting shaft is rotated relative to the first and second actuating shafts but the actuating shafts are not rotated is provided between the supporting base and the receiving base. Therefore, the coupled state between the deformed end portion of the supporting shaft and the deformed end portion of the one of the actuating shaft can be positively compensated in such a manner that engagement between the deformed end portion of the supporting shaft and the deformed end portion of the one of the actuating shaft is accomplished at the rotation-stating point of the operating lever, with the simple construction.

The terms and expression which have been employed herein are used as terms of description, not of limitation. There is no intention in the use of such terms and expression of excluding any equivalents of the features shown and described or portions thereof. However, it is recognized that various modifications are possible within the scope of the invention claimed.

What is claimed is:

1. An apparatus for use in welding of a seat back frame, said seat back frame including side frame sections, on lower portions of which first and second locking means for a reclining mechanism are provided, said first and second locking means including first and second actuating shafts which penetrate said side frame sections and project inward of said seat back frame so as to be aligned with each other, said first and second actuating shafts being coupled to each other through a supporting shaft, one of said first and second actuating shafts having an deformed end portion, said supporting shaft having first and second end portions, one of said first and second end portions of said supporting shaft having opposed deformed peripheral wall portions, the one of said first and second end portions of said supporting shaft being coupled to said deformed end portion of the one of said first and second actuating shafts so as to be rotatable relative to the one of said first and second actuating shafts at an angle of a few degrees, and the other of said first and second end portions of said supporting shaft being coupled to the other of said first and second actuating shafts and rigidly welded to the other of said first and second actuating shafts, said apparatus comprising:

a receiving base for allowing said seat back frame to be carried thereon in a laid state and adapted for serving as a base of said apparatus;

first setting means mounted on said receiving base for positioning and holding said seat back frame carried on said receiving base;

second setting means for clamping and holding said supporting shaft coupled to said first and second actuating shafts of said first and second locking means provided at said seat back frame;

stand bases mounted on said receiving base for supporting said second setting means in such a manner that said second setting means can be swung relative to said stand bases; and a first driving cylinder mounted on said receiving base and coupled to said second setting means for causing said second setting means to be swung relative to said stand bases prior to the welding of the other of said first and second end portions of said supporting shaft to the other of said first and second actuating shafts;

said first driving cylinder being adapted to develop a force to the extent that said supporting shaft held by said second setting means is rotated relative to said first and second actuating shafts of said first and second locking means provided at said seat back frame but said first and second actuating shafts are not rotated, when said first driving cylinder causes said second setting means to be swung, so that when said second setting means having clamped and held said supporting shaft is swung in a predetermined direction by said first driving cylinder, said supporting shaft is rotated by an allowed rotational amount relative to said first and second actuating shafts in a direction opposite to such a direction that said supporting shaft is shifted from a predetermined engaged point between said supporting shaft and said deformed end portion of the one of said first and second actuating shafts, whereby the one of said first and second end portions of said supporting shaft can be normally engaged with said deformed end portion of the one of said first and second actuating shafts at said predetermined engaged position prior to the welding of the other of said first and second actuating shafts to the other of said first and second actuating shafts.

2. An apparatus for use in welding of a seat back frame according to claim 1 wherein said first setting means comprises a plurality of dampers for clamping and holding said seat back frame on said receiving base from a periphery of said seat back frame.

3. An apparatus for use in welding of a seat back frame according to claim 1 wherein said second setting means comprises a supporting base having a step portion which comprises a vertical surface and a horizontal surface, an axis of said supporting shaft being adapted to be received by said vertical and horizontal surfaces; and a second driving cylinder for pressing said axis of said supporting shaft against said vertical surface of said supporting base, said second driving cylinder being provided integrally with said supporting base.

4. An apparatus for use in welding of a seat back frame according to claim 3 wherein said supporting base has supporting pins projecting from sides thereof, wherein said stand bases have circular-arc shaped guide grooves formed in sides thereof, said supporting pins of said supporting base being received in said guide grooves of said stand bases so as to be slid along said guide grooves, whereby said second setting means having held said axis of said supporting shaft can be swung, and wherein said first driving cylinder which generates the force to the extent that said supporting shaft is rotated relative to said first and second actuating shafts but said first and second actuating shafts are not rotated is provided between said supporting base and said receiving base.

* * * * *